Patented Sept. 8, 1925.

1,552,595

UNITED STATES PATENT OFFICE.

MELVILLE F. COOLBAUGH AND JOHN BURNS READ, OF DENVER, COLORADO.

PROCESS FOR THE EXTRACTION OF CADMIUM AS SULPHATE.

No Drawing. Application filed April 2, 1923, Serial No. 629,512. Renewed September 26, 1924.

*To all whom it may concern:*

Be it known that we, MELVILLE F. COOLBAUGH and JOHN BURNS READ, citizens of the United States, and residents of Denver, in the county of Denver, State of Colorado, have invented certain new and useful Improvements in Processes for the Extraction of Cadmium as Sulphate; and we do declare the following to be a full, clear, and exact description of the invention, such as will enable others skilled in the art to which it appertains to make and use the same.

The object of this invention is to recover cadmium as sulphate from flue dust and other materials which contain arsenic as well as cadmium, and to free the cadmium from such arsenic and other impurities.

Heretofore two methods have been employed in general for treatment of flue dust to recover cadmium therefrom. The first of these consists in driving off as much of the arsenic as possible by a preliminary roast, and then treating the mass with sulphuric acid followed by roasting at a temperature ranging between 300° C. and 700° C. to decompose and drive off the excess sulphuric acid. The product is then leached with water to dissolve the cadmium sulphate which is water soluble. But by this procedure a large proportion of the cadmium always remains in the residue united with the arsenic as cadmium arsenate. If this residue be treated with sulphuric acid, much of the cadmium will be taken into solution, but along with it there will also be obtained much of the arsenic in solution which must be separated by difficult methods before the cadmium can be obtained in marketable condition. The second of the two methods consists in dissolving the cadmium and arsenic as completely as possible with sulphuric acid, and then precipitating the arsenic by neutralizing the solution with an alkali and adding ferric sulphate to obtain ferric arsenate. But the ferric arsenate so precipitated is a bulky colloidal mass which is very difficult to filter and wash, and therefore retains large amounts of the cadmium. This finely colloidal mass is also more or less readily washed through the filter, thereby contaminating the filtrate containing the dissolved cadmium sulphate. Thus, neither of these methods has been satisfactory either as to percentage of recovery or as to manipulation.

By the present process, iron pyrites is added to the flue dust or other cadmium and arsenic bearing materials in quantity somewhat more than equivalent to the arsenic present, and the mixture is roasted to produce ferric oxide for the subsequent formation of ferric arsenate, and to drive off some of the arsenous oxide ($As_2O_3$) as such and also in the form of arsenous sulphide ($As_2S_3$). Sulfuric acid is then mixed with the roasted materials in quantity somewhat greater than the chemical equivalent of the metal oxides present, and this mass is roasted at a temperature between 300° C. and 700° C. until the major portion or all of the excess sulphuric acid is decomposed and driven off. This treatment results in the formation of lead and cadmium sulphates, the latter being soluble, and causes the arsenic to combine with the ferric iron ($Fe_2O_3$) to form a ferric arsenate in the dry way which is quite granular in nature, is insoluble in water and is filtered easily.

From the insoluble, granular ferric arsenate thus formed, and any lead or other insoluble sulphates present, the soluble cadmium sulphate is readily leached with water, and a very high percentage recovery of the cadmium is obtained.

While the object of the initial roast of the pyrites with the flue dust is for the purpose of forming ferric oxide ($Fe_2O_3$) and driving off some of the arsenic, there are also formed some cadmium and lead sulphates, as above mentioned, and some cadmium and lead arsenates, along with some other sulphates and arsenates. These sulphates permit a corresponding decrease in the amount of sulphuric acid required in the next step for complete conversion of cadmium, lead and other metals to sulphates with the accompanying conversion of all the arsenic into ferric arsenate.

For economic reasons, it is usually desirable to treat the flue dust in a preliminary roast before addition of the iron pyrites for the purpose of eliminating at this point as much of the arsenous oxide as possible. The pyrites is then added and the roast continued to yield ferric oxide as above, this being followed by the sulphuric acid roast. Thus the roast of the dust before and after addition of the pyrites results in the elimination of the greatest amount of arsenous oxide, which is collected in the flue and recovered.

Where ferric oxide may be obtained economically, the process may be carried thereon without the use of pyrites. In this instance the flue dust may first be roasted to drive off arsenous oxide, and then mixed with the ferric oxide and roasted. Or either or both of these roasts may be omitted. The ferric oxide and the flue dust are then mixed with sulphuric acid and the roast between 300° C. and 700° C. is carried on as with the other methods with the same results. It will also be possible to use ferric sulphate and other iron compounds, which will be mixed with the flue dust and sulphuric acid and roasted to convert the cadmium and arsenic to cadmium sulphate and ferric arsenate, as above. However, iron pyrites is ordinarily available and much cheaper than the other iron compounds and therefore will be used ordinarily.

In a co-pending application, Serial No. 684,086, of Jan. 2, 1924, I have disclosed and claimed the process for the recovery of cadmium as sulphate from arsenic and cadmium bearing materials which includes adding iron sulphur-containing material to said arsenic and cadmium bearing materials, roasting the same in the presence of a small quantity of air to drive off arsenic and then continuing to roast the resultant products in the presence of a greater quantity of air to convert the cadmium to sulphate.

We claim:

1. A process for the recovery of cadmium as sulphate from arsenic and cadmium bearing materials comprising roasting the materials with sulphuric acid and ferric compounds to produce cadmium sulphate and a ferric arsenate from which the cadmium sulphate may be readily leached with water.

2. A process for the extraction of cadmium as sulphate from arsenic and cadmium bearing compounds comprising roasting the compounds with ferric compounds and sulphuric acid to approximate dryness thereby producing cadmium sulphate which is water-soluble and a granular ferric arsenate from which the cadmium sulphate may be readily leached.

3. A process for the recovery of cadmium as sulphate from arsenic and cadmium bearing materials comprising roasting the materials with iron-containing and sulphate-forming materials to produce cadmium sulphate and a granular ferric arsenate from which the cadmium sulphate may be readily leached.

4. A process for the extraction of cadmium as sulphate from arsenic and cadmium bearing compounds comprising roasting said compounds with ferric oxide and sulphuric acid to approximate dryness thereby producing cadmimum sulphate and a granular ferric arsenate from which the cadmium sulphate may be readily leached.

5. A process for the extraction of cadmium as sulphate from arsenic and cadmium bearing compounds comprising roasting said compounds with ferric oxide and sulphate-forming materials to produce cadmium sulphate and a granular ferric arsenate from which the cadmium sulphate may be leached.

6. A process for the extraction of cadmium as sulphate from arsenic and cadmium containing compounds comprising roasting said compounds with an iron compound and sulphuric acid to produce cadmium sulphate and a ferric arsenate.

7. A process for the extraction of cadmium as sulphate from arsenic and cadmium compounds comprising roasting said compounds with iron pyrites to form ferric oxide, mixing sulphuric acid with the roasted materials, and roasting the mixture to drive off the excess sulphuric acid and form cadmium sulphate and a ferric arsenate from which the cadmium sulphate may be readily leached.

8. A process for the extraction of cadmium as sulphate from arsenic and cadmium bearing materials comprising roasting said materials with iron pyrites to form ferric oxide, mixing sulphuric acid with the roasted materials, and roasting the mixture to form cadmium sulphate and a ferric arsenate from which the cadmium sulphate may be readily leached, said arsenate being granular in form.

In testimony whereof we affix our signature.

MELVILLE F. COOLBAUGH.
J. BURNS READ.